Sept. 13, 1960 J. E. LYLE ET AL 2,952,321
PEANUT HARVESTER
Filed May 23, 1958 2 Sheets-Sheet 1
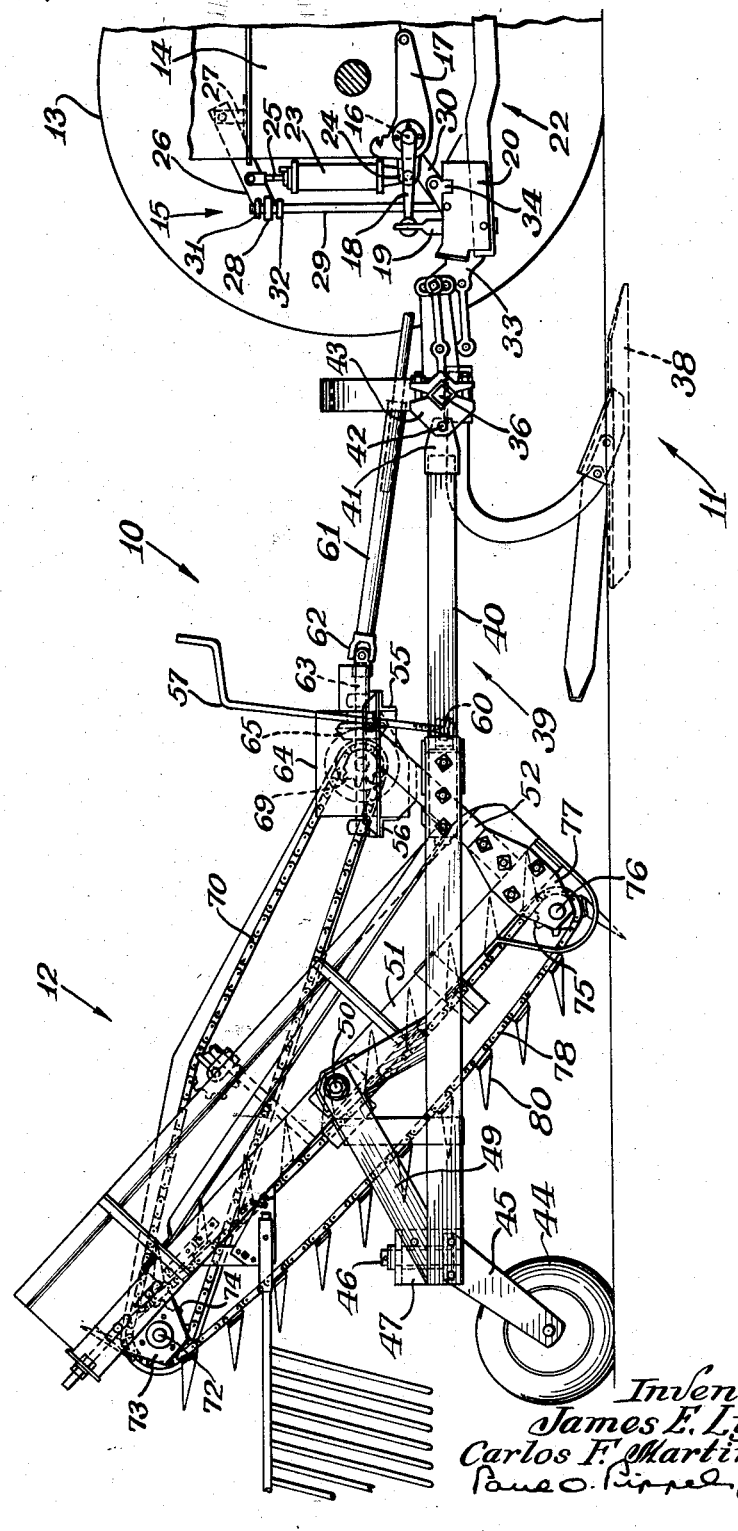
Inventors:
James E. Lyle
Carlos F. Martinez

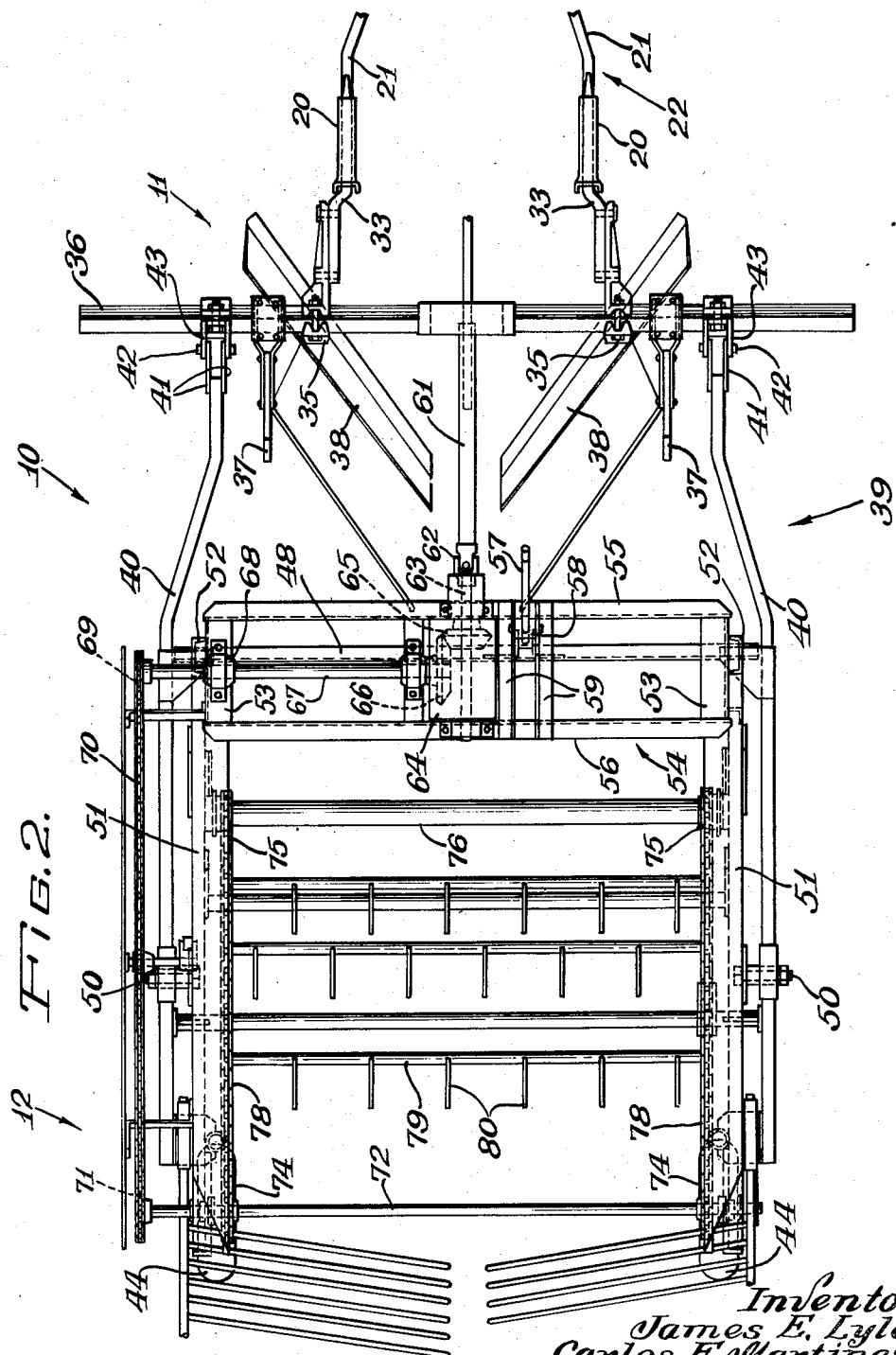

# United States Patent Office 2,952,321
Patented Sept. 13, 1960

2,952,321
PEANUT HARVESTER

James E. Lyle and Carlos F. Martinez, Saltillo, Coahuila, Mexico, assignors to International Harvester Company, Chicago, Ill., a corporation of New Jersey Filed May 23, 1958, Ser. No. 737,405

4 Claims. (Cl. 171—94)

This invention relates to agricultural implements and particularly to apparatus for treating mature crops. More specifically, the invention concerns a harvesting machine for peanuts and the like.

An object of the invention is the provision of a tractor attached peanut harvester of the integral type wherein the implement hitch frame is provided with attaching elements adapted for integral connection with a tractor draft structure, and wherein the harvester includes a conveyor supporting frame having a hinged connection with the hitch frame allowing independent floating of the conveyor supporting frame.

Another object of the invention is the provision of a harvesting implement for peanuts and the like wherein the implement includes a main frame having a hitch portion for connection to the tractor draft structure and a wheel supported portion pivotally connected to the hitch portion for vertical swinging relative thereto, and a conveyor sub-frame is pivotally mounted medially of its ends on the wheel supported frame portion for rocking about a transverse axis, the sub-frame being adjustable relative to the wheel supported frame to vary the position of the conveyor relative thereto and to the ground.

Another object of the invention is the provision of a tractor attached harvester for peanuts and the like wherein the harvester includes a main frame having a tool bar portion adapted for integral connection to the tractor to be raised and lowered thereby and having crop digging blades mounted thereon, a wheel supported portion hinged to said tool bar portion, and a conveyor unit pivotally mounted on said wheel supported portion for rocking in a vertical plane and in the path of the peanuts dug by said blades, and wherein means are provided for adjusting the conveyor about its pivot axis and holding it in position.

Other objects and advantages of the invention will become clear from the following detailed description when read in conjunction with the accompanying drawings, wherein:

Figure 1 is a view in side elevation of the rear end of a tractor, with one drive wheel removed, having attached thereto a harvesting machine embodying the features of this invention; and Figure 2 is a plan view of the harvesting machine shown in Figure 1 without the tractor and lift parts shown in Figure 1.

In the drawings the numeral 10 designates a peanut harvester comprising generally a digger 11 and a combination shaker and pick-up conveyor 12 adapted for attachment to a tractor having rear drive wheels 13, only one of which is shown, and a tractor body 14.

Conventional lift means indicated at 15 is provided on the tractor and includes a transversely extending rockshaft 16 mounted in laterally spaced brackets 17 secured to the tractor body, and having its ends bent at right angles rearwardly to form a pair of laterally spaced lift arms 18, only one of which is shown. Each lift arm 18 is connected by a lifting link 19 to socket members 20 affixed to the laterally spaced rearwardly extending arms 21 of a draft structure 22 pivotally connected, in a manner not shown, to the tractor body 14.

Raising and lowering of the draft structure 22 and of the implement 10 connected thereto is accomplished by means comprising a hydraulic ram 23 anchored at its lower end to a lug 24 affixed to the tractor body, and having a piston rod 25 slidable therein and connected to a link 26 which in turn is pivotally connected to a lug 27 affixed to the tractor body. Thus, extension of piston rod 25 and ram 23 swings link 26 about its pivot on the lug 27. Carried at the end of link 26 is an eyebolt 28 in which is slidably receivable the upper end of a rod 29, the lower end of which is connected to an arm 30 affixed to transverse shaft 16. Stop collars 31 and 32 are provided on each side of the eye bolt 28 on rod 29 to accommodate floating of the draft structure 22 and of the front end of the implement 10 in operation, and lifting of the draft structure 22 for transport of the implement.

The implement 10 is provided with a pair of laterally spaced longitudinally extending hitching shafts 33 adapted to be slidably received in sockets 20 to form an integral connection therewith and to be locked therein in draft receiving relation by suitable latch means 34, the details of construction of which form no part of this invention. The rear ends of shaft members 33 are adjustably secured by clamps 35 to a transversely extending tool bar 36, square in cross-section, upon which is also mounted a pair of laterally spaced tool standards 37 carrying rearwardly converging earth penetrating digger blades 38 at their lower ends.

The combination pick-up conveyor and shaker 12 is carried upon a wheel supported generally rectangular frame 39 including laterally spaced longitudinally extending frame bars 40, the forward ends of which are bent inwardly and have secured to their forward ends a pair of plates 41, which are received between and pivotally connected at 42 to the spaced arms of a U-shaped clamping element 43 secured to the tool bar 36. The rear ends of arms 40 of frame 39 are supported by wheels 44, each of which is mounted on an arm 45 having affixed thereto a vertical spindle 46 rotatably received in a bearing bracket 47 secured to the bar 40, to accommodate castering of the wheels. A cross brace 48 connects the bars 40, and the latter extends rearwardly therefrom in a generally U-shape.

An upright support 49, triangular in shape, is affixed to and extends upwardly from each of the side bars 40 near its rear end and carries a pivot pin 50. Pivot pins 50 on opposite sides of the main frame 39 support an auxiliary or sub-frame consisting of the pick-up conveyor and shaker structure 12 comprising laterally spaced side bars 51 which are inclined upwardly and rearwardly and are mounted medially of their ends on the pivot pins 50 for rocking in a vertical plane.

Many of the constructional details of the pick-up conveyor 12 form no part of this invention. However, it should be noted that the forward ends of the side bars 51 extend below the main frame 39 and have secured thereto upwardly and forwardly extending standards or posts 52 to the upper ends of which are affixed the end bars 53 of a transversely extending rectangular frame 54 including front and rear frame bars 55 and 56. A crank 57 is rotatably connected to a swivel member 58 mounted between a pair of angle bars 59 affixed to and extending between the bars 55 and 56. The lower end of the crank is threaded for reception in a threaded swivel 60 pivotally connected to the brace member 48 of frame 39. Manipulation of crank 57 rocks the conveyor 12 about the axis of pivots 50 with respect to frame 39 to regulate the position of the lower forward end of the conveyor relative to the ground and the peanut crop to be treated.

A telescoping shaft 61, driven in a manner not shown by power derived from the tractor, is connected by a universal joint 62 to a shaft 63 extending into a housing 64 mounted on the bars 55 and 56. A bevel gear 65 mounted on the end of shaft 63 within the housing 64 engages another bevel gear 66 mounted on the end of a cross shaft 67 rotatably supported in a bearing 68 mounted on one of the end bars 53. The end of shaft 67 carries a sprocket wheel 69 connected by a chain 70 to another sprocket wheel 71 mounted on a cross shaft 72 carried by brackets 73 affixed to the side members 51 and serving to brace the latter. Additional sprocket wheels 74, laterally spaced on shaft 72 are connected to sprocket wheels 75, in alignment with their respective sprocket wheels on shaft 72, mounted upon a shaft 76 mounted in the projecting lower ends of plates 77 affixed to the side bars 51 and posts 52. Endless chains 78 extend between the sprocket wheels 74 and 75 and serve as the anchors for the ends of a plurality of transverse flight bars 79 to which are affixed pick-up fingers 80. The fingers 80 engage and pick up the plants dug by the digging apparatus 11 and carry the plants upwardly and rearwardly until they are discharged over the upper end of the conveyor, the action of the conveyor being such as to agitate the crops as they are conveyed upwardly.

The peanut harvester of this invention is designed to meet adverse operating conditions and to follow the contour of the ground. Thus the portion of the frame which carries the pick-up device and elevator for the vines is capable of limited vertical floating movement relative to the digging apparatus by which the vines are removed from the ground, and the latter is capable of vertical floating movement relative to the propelling vehicle upon which it is mounted. The invention further involves a novel mounting for the elevator midway of its ends on a wheel supporting frame so that the tilt of the elevator or conveyor and the position of the crop engaging end thereof with respect to the ground may be adjusted.

The foregoing is a description of a preferred embodiment of this invention and it should be understood that modifications may be made therein without departing from the spirit of the invention or the scope of the appended claims.

What is claimed is:

1. A crop treating implement for attachment to a tractor having a vertically floating draft structure and lift means connected to the draft structure for raising and lowering the latter, comprising a main frame having side bars, a hitch frame at the forward end of the main frame having means thereon for connection to said draft structure to be raised and lowered therewith, ground wheels supporting the rear end of said main frame, means hingedly connecting the forward end of the main frame to said hitch frame for vertical movement relative thereto, and a conveyor sub-frame pivotally mounted between said side bars for rocking in a vertical plane relative to the main frame.

2. A harvester for peanuts and like crops adapted for attachment to a tractor having a draft structure and lift means operatively connected to said draft structure for raising and lowering the latter, comprising a transverse tool bar, attachment elements affixed to said tool bar and adapted for integral connection to complementary attaching elements on said draft structure to be raised and lowered therewith, digging blades mounted on said tool bar and arranged to penetrate the soil and lift the crops to the surface of the ground, laterally spaced frame bars extending rearwardly from said tool bar and pivotally connected at their forward ends thereto for relative vertical swinging, wheels supporting the rear ends of said bars whereby vertical movement of said draft structure raises and lowers the forward ends of said frame bars, upright supports on said bars having transverse pivot members thereon, and a conveyor unit mounted medially of its ends on said pivot members for rocking in a vertical plane, said conveyor unit being inclined upwardly and rearwardly and having its forward end disposed below said frame bars in the path of the crops dug by said blades, and means operatively connected between said frame bars and said conveyor unit for rocking the latter about the axis of said pivot members independently of said digging blades and for holding it vertically rigid in selected adjusted positions.

3. A harvester for peanut and like crops adapted for attachment to a tractor having a draft structure and lift means operatively connected to said draft structure for raising and lowering the latter, comprising a transverse tool bar, attaching elements affixed to said tool bar and adapted for integral connection to complementary attaching elements on said draft structure to be raised and lowered therewith, digging blades mounted on said tool bar and arranged to penetrate the soil and lift the crops to the surface of the ground, laterally spaced frame bars extending rearwardly from said tool bar and pivotally connected at their forward ends thereto for relative vertical swinging, wheels supporting the rear ends of said bars whereby vertical movement of said draft structure raises and lowers the forward ends of said frame bars, upright supports on said bars having transverse pivot members thereon, a conveyor unit mounted medially of its ends on said pivot members for rocking in a vertical plane, said conveyor unit being inclined upwardly and rearwardly and having its forward end disposed below said frame bars in the path of the crops dug by said blades, and an adjustable member operatively connecting said frame bars to said conveyor unit, said adjustable member being adjustable to rock said conveyor unit about its pivots on said supports and to hold said unit vertically rigid in selected adjusted positions.

4. A harvester for peanuts and like crops adapted for attachment to a tractor having power lift means thereon comprising, a draft structure mounted on the tractor for vertical floating movement relative thereto and connected to the power lift means to be raised and lowered thereby, a longitudinally extending main frame having wheels supporting the rear end thereof, a hitch frame at the forward end of the main frame having digging blades thereon and hingedly connected to the main frame to accommodate vertical movement of said main frame relative to said hitch frame, means connecting said hitch frame to said draft structure to be raised and lowered therewith, said digging blades being adapted to rise and fall with the hitch frame in response to changes in ground contour and to remove the crops from the ground, and a pick-up conveyor mounted on the main frame to pick up and deliver rearwardly the crops removed by said digging blades.

References Cited in the file of this patent

UNITED STATES PATENTS

| | | |
|---|---|---|
| 2,539,834 | Hatton | Jan. 30, 1951 |
| 2,562,659 | Carter et al. | July 31, 1951 |
| 2,595,340 | Diethelm | May 6, 1952 |
| 2,669,820 | Falkner | Feb. 23, 1954 |